US012430154B2

(12) United States Patent
Coward et al.

(10) Patent No.: US 12,430,154 B2
(45) Date of Patent: Sep. 30, 2025

(54) APPARATUS, DEVICE, METHOD AND COMPUTER PROGRAM FOR AN INTEGRATED DEVELOPMENT ENVIRONMENT (71) Applicant: Intel Corporation, Santa Clara, CA (US)

(72) Inventors: Samuel Coward, London (GB); Michael Langenbuch, Munich (DE); Jia Ho Lee, Munich (DE)

(73) Assignee: Intel Corporation, Santa Clara, CA (US)

(*) Notice: Subject to any disclaimer, the term of this patent is extended or adjusted under 35 U.S.C. 154(b) by 778 days.

(21) Appl. No.: 17/644,112

(22) Filed: Dec. 14, 2021

(65) Prior Publication Data

US 2022/0365798 A1 Nov. 17, 2022

(51) Int. Cl.
G06F 9/44 (2018.01)
G06F 8/30 (2018.01)
(Continued)

(52) U.S. Cl.
CPC .............. G06F 9/454 (2018.02); G06F 8/30 (2013.01); G06F 8/41 (2013.01)

(58) Field of Classification Search
CPC .............. G06F 9/454; G06F 8/30; G06F 8/41
See application file for complete search history.

(56) References Cited

U.S. PATENT DOCUMENTS 10,078,504 B1 * 9/2018 Franovic .................. G06F 8/60
11,119,735 B1 * 9/2021 Baafi ........................ G06F 8/33
(Continued)

FOREIGN PATENT DOCUMENTS

CN 113343718 A * 9/2021 ............. G06F 40/58
CN 113590185 A * 11/2021 ............. G06F 40/40

OTHER PUBLICATIONS

Sebastian Proksch, Enriching In-IDE Process Information with Fine-Grained Source Code History, 2017, pp. 1-11. https://ieeexplore.ieee.org/stamp/stamp.jsp?tp=&arnumber=7884626 (Year: 2017).*
(Continued)

Primary Examiner — Mongbao Nguyen
(74) Attorney, Agent, or Firm — 2SPL Patentanwälte PartG mbB; Yong Beom Hwang (57) ABSTRACT Various examples relate to an apparatus, a device, a method, and a computer program for an integrated development environment. The apparatus comprises processing circuitry configured to provide a first user interface component of the integrated development environment for editing code written in a programming language, provide a second user interface component of the integrated development environment for selecting an intermediate language to use for displaying the code in the first user interface component, and translate keywords of the code between the selected intermediate language and corresponding keywords of the programming language when loading code for editing in the first user interface component from a file and when saving code edited in the first user interface component to a file, with the programming language being based on a language that is different from the selected intermediate language.

19 Claims, 5 Drawing Sheets (51) Int. Cl.
    *G06F 8/41*     (2018.01)
    *G06F 9/445*     (2018.01)
    *G06F 9/451*     (2018.01)
    *G06F 9/455*     (2018.01)

(56) References Cited

U.S. PATENT DOCUMENTS

| | | | |
|---|---|---|---|
| 2019/0278569 A1* | 9/2019 | Horton | G06F 8/34 |
| 2020/0125482 A1* | 4/2020 | Smith | G06N 3/044 |
| 2020/0183658 A1* | 6/2020 | Lin | G06F 11/3664 |
| 2020/0264852 A1* | 8/2020 | Craymer, III | G06F 8/447 |
| 2021/0034335 A1* | 2/2021 | Svyatkovskiy | G06N 3/088 |
| 2021/0405977 A1* | 12/2021 | Baafi | G06F 3/0486 |

OTHER PUBLICATIONS

Jeremiah Blanchard (Amphibian: Dual-Modality Representation in Integrated Development Environments, 2019, pp. 1-3. https://ieeexplore.ieee.org/stamp/stamp.jsp?tp=&arnumber=8941213 (Year: 2019).*
English translation, Zhang et al. (CN 113343718 A), 2021, pp. 1-8. (Year: 2021).*
Bo Shen, Cross-language Code Coupling Detection: A Preliminary Study on Android Applications, 2021, pp. 1-12. https://ieeexplore.ieee.org/stamp/stamp.jsp?tp=&arnumber=9609127 (Year: 2021).*
English translation, Zhang et al. (CN 113343718 A), 2021, pp. 1-12. (Year: 2021).*
English translation, Xu (CN 113590185 A), 2021, pp. 1-12. (Year: 2021).*

* cited by examiner

```
#print hello world 10 times
i=0
while i<10:
    print("Hello World")
    i+=1
```

| UTF-8 | CRLF | Plain Text |
|---|---|---|
| 310 | 320 | 330 |

```
#print hello world 10 times
i=0
while i<10:
    print("Hello World")
    i+=1
```

| UTF-8 | CRLF | Python |
|---|---|---|
|  |  | 340 |

Fig. 3a

```
i=0
while i<10:
    print("Hello World")
    i+=1
```

| English | UTF-8 | CRLF | Python |
|---|---|---|---|
| 350 | 310 | 320 | 340 |

```
i=0
podczas i<10:
    pokaz("Hello World")
    i+=1
```

| Polish | UTF-8 | CRLF | Python |
|---|---|---|---|
| 360 |  |  |  |

APPARATUS, DEVICE, METHOD AND COMPUTER PROGRAM FOR AN INTEGRATED DEVELOPMENT ENVIRONMENT

BACKGROUND

In programming, most, if not all, widely used programming languages are based on the English language. Especially for non-English speaking beginners, this sets a significant barrier when starting to write computer programs. Even for experienced programmers, the spoken language barrier can prevent effective international collaborative development.

There are some approaches to enable programming outside the English language. For example, specialized programming languages, such as Citrine, use dictionary-based translation that is built into the compiler to translate between spoken languages. Another approach uses the pre-processor to exchange the keywords in different spoken languages, once a dictionary is provided (e.g., German Pre-Processed C). Moreover, aimed at children, graphical representations of computer code are popular (e.g., Lego MindStorm and Scratch), where text-based programming is replaced with diagrams and animated connections.

However, professional programming is based on text and mainstream programming languages, which guarantees a unique and precise nomenclature, solid support for tools and libraries and a large user community. Inertia amongst professional developers means that new programming languages often struggle to gain a foothold. The additional effort required for learning a niche, novel programming language, may hamper the adoption of the above approaches.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements. If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

Figure 1A:
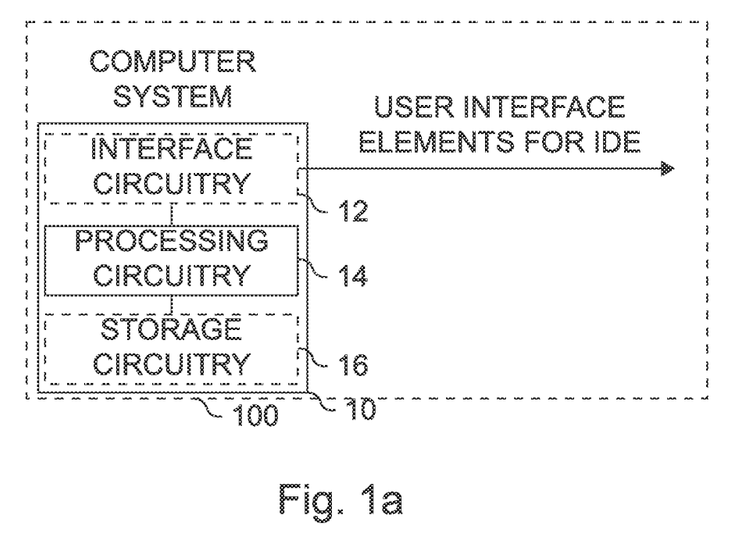
FIGS. 1a and 1b show block diagrams of examples of an apparatus or device for an interated development environment, and of a computer system comprising such an apparatus or device.
Figure 1B:
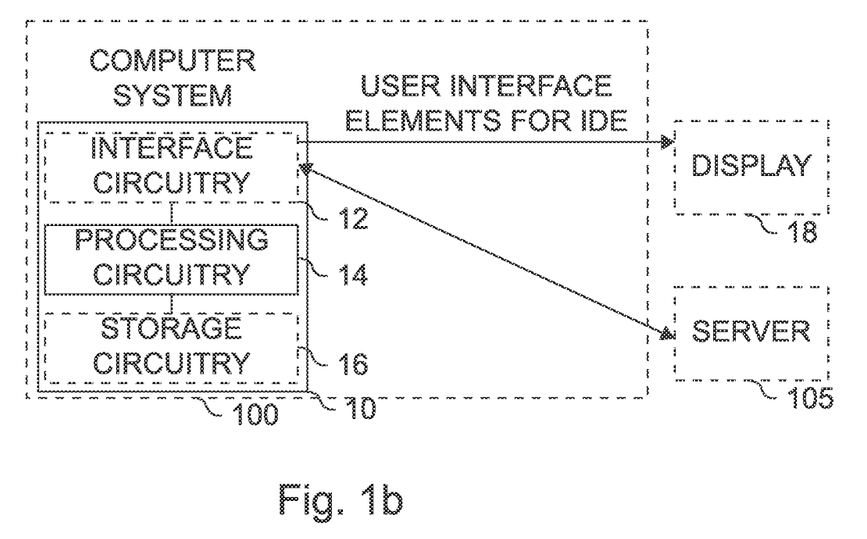

FIGS. 1a and 1b show block diagrams of examples of an apparatus 10 or device 10 for an integrated development environment, and of a computer system 100 comprising such an apparatus 10 or device 10. The apparatus 10 comprises circuitry that is configured to provide the functionality of the apparatus 10. For example, the apparatus 10 of FIGS. 1*a* and 1*b* comprises (optional) interface circuitry 12, processing circuitry 14 and (optional) storage circuitry 16. For example, the processing circuitry 14 may be coupled with the interface circuitry 12 and with the storage circuitry 16. For example, the processing circuitry 14 may be configured to provide the functionality of the apparatus, in conjunction with the interface circuitry 12 (for exchanging information, e.g., with a display 18 and/or with a server 105, as shown in FIG. 1*b*) and the storage circuitry (for storing information) 16. Likewise, the device 10 may comprise means that is/are configured to provide the functionality of the device 10.

The components of the device 10 are defined as component means, which may correspond to, or implemented by, the respective structural components of the apparatus 10. For example, the device 10 of FIGS. 1*a* and 1*b* comprises means for processing 14, which may correspond to or be implemented by the processing circuitry 14, (optional) means for communicating 12, which may correspond to or be implemented by the interface circuitry 12, and (optional) means for storing information 16, which may correspond to or be implemented by the storage circuitry 16.

Figure 1C:
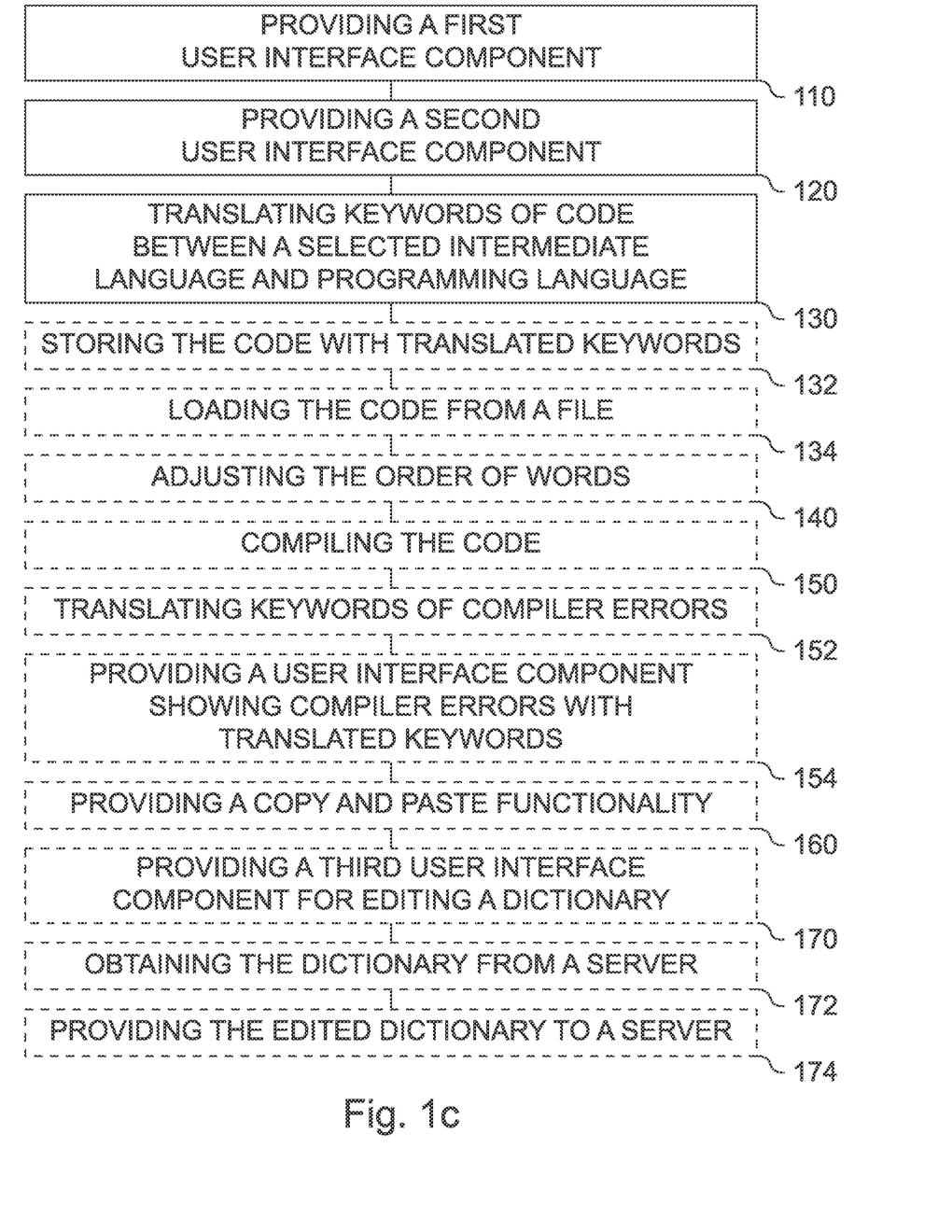
FIG. 1c shows a flow chart of an example of a method for an integrated development environment.

The processing circuitry 14 or means for processing 14 is configured to provide a first user interface component of the integrated development environment for editing code written in a programming language. The processing circuitry 14 or means for processing 14 is configured to provide a second user interface component of the integrated development environment for selecting an intermediate language to use for displaying the code in the first user interface component. The processing circuitry 14 or means for processing 14 is configured to translate keywords of the code between the selected intermediate language and corresponding keywords of the programming language when loading code for editing in the first user interface component from a file and when saving code edited in the first user interface component to a file. The programming language is based on a language that is different from the selected intermediate language. FIG. 1*c* shows a flow chart of an example of a corresponding method for an integrated development environment. The method comprises providing 110 the first user interface component of the integrated development environment for editing code written in a programming language. The method comprises providing 120 the second user interface component of the integrated development environment for selecting an intermediate language to use for displaying the code in the first user interface component. The method comprises translating 130 the keywords of the code between the selected intermediate language and corresponding keywords of the programming language when loading code for editing in the first user interface component from a file and when saving code edited in the first user interface component to a file. For example, the computer system 100 may be configured to perform the method of FIG. 1*c*.

In the following, the functionality of the apparatus 10, the device 10, the method and of a corresponding computer program is illustrated with respect to the apparatus 10. Features introduced in connection with the apparatus 10 may likewise be included in the corresponding device 10, method and computer program.

Various examples relate to an apparatus, a device, a method, and a computer program for an integrated development environment (IDE). In particular, the proposed concept may provide functionality that extends the functionality commonly known from IDEs. The proposed concept is based on providing a translation functionality that tightly interfaces with a text editor component of the IDE (i.e., the first user interface component), and which provides on-the-fly translation of keywords of a programming language for display in the IDE, while using the non-translated code (i.e., the code in the programming language without translated keywords) for storing, loading, and compiling the code, and for interfacing with (external) libraries. In other words, the code can be edited with translated keywords in the first user interface component but is stored in the "original" programming language, i.e., without translated keywords.

Figure 3A:
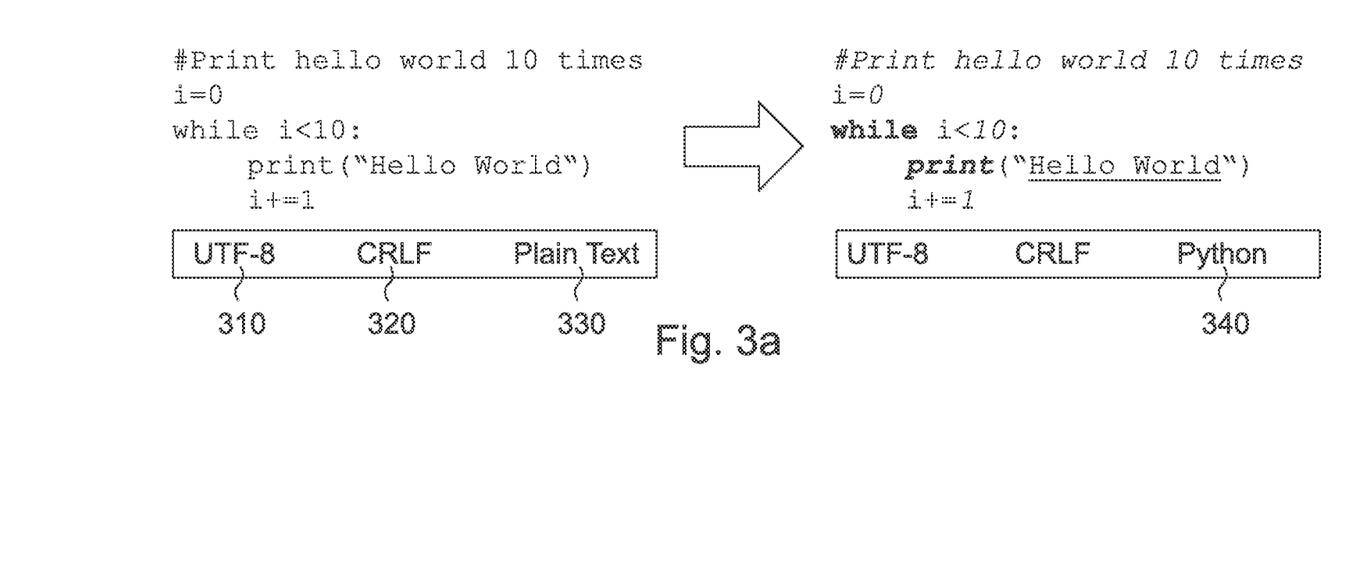
FIG. 3a shows a schematic illustration of a user interface of an integrated development environment.
Figure 3B:
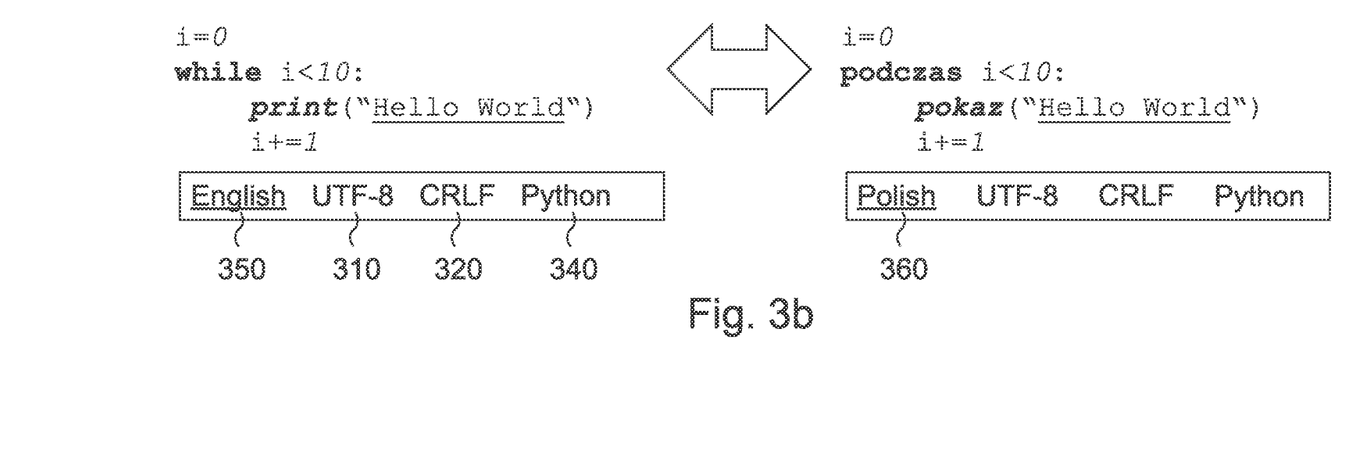
FIG. 3b shows a schematic illustration of a user interface of an integrated development environment, enabling the selection of an intermediate language.

The apparatus is configured to provide the first and second user interface component. The first user interface component can be used to edit the code, while the second user interface component can be used to select an intermediate language. For example, as shown in FIG. 3*b*, the first user interface component may be displayed vertically above the second user interface component, which may be implemented as a dropdown menu that can be accessed from a menu bar. In other words, the first user interface component may be a text editor window or text editor window portion, e.g., a text editor user interface component. The second user interface component may be a dropdown menu or any other suitable type of selection menu. If only a single intermediate language is supported (or pre-defined by the user), the second user interface component may be a (binary) toggle.

The first user interface component is used for editing the code. For example, the code may be displayed in the first user interface component, e.g., with syntax highlighting. The processing circuitry may be configured to provide the code in the first user interface component. For example, the processing circuitry may be configured to apply syntax highlighting to the code displayed in the first user interface component, e.g., based on syntax highlighting rules applied for the programming language and based on the (untranslated) programming language. In other words, while the code can be displayed in a translated manner in the first user interface component, the syntax highlighting may be derived from the (untranslated) code written in the programming language.

The second user interface component is provided to enable selecting the intermediate language to use for displaying the code in the first user interface component. In other words, the second user interface component may be provided to enable the user to switch between a representation of the code in the programming language (i.e., without translated keywords) and a representation of the code with the keywords being translated into the selected intermediate language. In particular, the second user interface component of the integrated development environment may be suitable for selecting between the programming language (without translated keywords) and one or more intermediate languages (e.g., a plurality of intermediate languages), with the intermediate languages influencing the language in which the keywords are shown.

In the present disclosure, the distinction is made between the programming language, which is a functional language being used to define commands to be executed programmatically on a computer, and so-called intermediate languages, which are not programming languages. For example, the programming language may be one of C, C++, C#, Objective C, Swift, Java, Kotlin, Go, Perl, Python, JavaScript, and assembly language. The term intermediate language is used as the language being selected (only) affects the displaying of the code, and not the storage of the code. For example, the intermediate language may be a nonprogramming language, i.e., a language as commonly understood by most people. For example, the intermediate language may be a spoken language (albeit it is written in this instance). For example, the intermediate language may be one of a natural language, an artificial or invented language and a symbolic language.

As outlined above, the programming language is not an intermediate language. However, the programming language may be based on a natural language, most commonly the English language. To give the most common example, the programming language may be based on the English language and the selected intermediate language is a language other than English (e.g., Mandarin, Polish, German, Italian, Russian etc.)

The proposed concept is based on translating keywords of the programming language in, and from, the selected intermediate language. The term "keywords" may relate to any (non-symbolic) statement that is used to program in the programming language. For example, the keywords relate to programming statements of the programming language. For example, the at least some keywords may relate to programming instructions of the programming language. For example, in some cases, e.g., if the parameters of a function call require the use of a parameter name, at least some keywords may further to parameter names of programming instructions of the programming language. For example, at least some keywords may relate to enumeration values (e.g., colors, days of the week, transparent/opaque, font styles (narrow, regular, bold, italic) etc.) being used in the programming language. For example, at least some keywords may relate to function names and/or parameters of (commonly used) application programming interfaces (APIs).

The processing circuitry is configured to translate the keywords of the code between the selected intermediate language and corresponding keywords of the programming language when loading code for editing in the first user interface component from a file and when saving code edited in the first user interface component to a file. Accordingly, the code, as stored in the file, is stored in the programming language, without translated keywords. For example, returning to the example given above, the code may be stored according to the programming language that is based on the English language. While the code is edited in the selected intermediate language (or in the untranslated programming language, if this option is selected using the second user interface element), the code, as displayed, is translated into the programming language (without translated keywords) when the code is being stored in a file. Accordingly, the processing circuitry may be configured to translate keywords written in the selected intermediate language into the corresponding keywords of the programming language and to store the code with the translated keywords in the file. Correspondingly, as further shown in FIG. 1c, the method may comprise translating 130 keywords written in the selected intermediate language into the corresponding keywords of the programming language and storing 132 the code with the translated keywords in the file.

The reverse process is being used when the code is being loaded from the file. The processing circuitry may be configured to translate keywords of the programming language into corresponding keywords in the selected intermediate language (for displaying in the first user interface element) when loading the code from the file. Accordingly, as further shown in FIG. 1c, the method may comprise translating 130 keywords of the programming language into corresponding keywords in the selected intermediate language when loading 134 the code from the file.

In general, a dictionary-based approach may be chosen. In other words, the processing circuitry may be configured to perform the translation based on a dictionary. Contrary to the programming language Citrine, which also uses a dictionary-based approach, the translation is being applied when displaying and editing code in the code editor, and not in the compiler. The dictionary may define, for the keywords of the programming language, corresponding keywords in the selected intermediate language. The processing circuitry may be configured to replace, when loading the code from the file, the keywords of the programming language with the corresponding keywords in the selected intermediate language. Moreover, the processing circuitry may be configured to replace, when storing the code in the file, the keywords in the selected intermediate language with the corresponding keywords of the programming language. When loading or storing the code, words in parentheses may be excluded from translation.

In some languages, the ordering of words relative to operators, or the ordering between keywords, may be different than in English. For example, the "return" statement used to define the return value of a function may be translated to "gebe zurück" in German, with the variable being returned being inserted between the two words: "gebe <variable>zurück". Consequently, the "zurück" portion of the translated keywords may require some positional translation relative to the use of "return" in the English-based programming language. For example, the dictionary may further define, for at least a subset of the corresponding keywords in the selected intermediate language, information on a positional translation of the keyword (e.g., of portions of the resulting translated keyword). The processing circuitry may be configured to adjust the order of words of the code relative to the respective keywords based on the information on the positional translation of the keyword, e.g., by switching the order of words in the code by changing the position of (portions) of the keywords. Accordingly, the method may comprise adjusting 140 the order of words of the code relative to the respective keywords based on the information on the positional translation of the keyword. For example, the processing circuitry may be configured to alter, for at least a subset of the keywords, a position of the keyword of the programming language relative to an operator or another keyword when storing the code in the file, and a position of the translated keyword relative to an operator or another keyword when loading the file.

As outlined above, the code is stored in the programming language, i.e., without translation. For example, the processing circuitry may be configured to compile the code in the file. Accordingly, the method may comprise compiling 150 the code in the file. The code is stored in the programming language in the file (i.e., without the keywords being translated when stored in the file) Therefore, the compiler might not have to be modified to support the proposed concept, as it operates on the untranslated code. In programming, however, the compiler is not only used to generate the binary being executed, but the compiler is also an important tool for debugging the code. For example, the compiler may be configured to output warnings, information about deprecated functionality and compiler errors when compiling the code, which may be used by the developer to find errors and/or to improve the code. This information is very valuable to the developer. Therefore, in some examples, the warnings and errors may also be translated. The processing circuitry may be configured to translate keywords of compiler errors and/or compiler warnings into the selected intermediate language, and to provide a user interface component showing at least a subset of the compiler errors and/or compiler warnings with translated keywords. Accordingly, as further shown in FIG. 1c, the method may comprise translating 152 keywords of compiler errors and/or compiler warnings into the selected intermediate language and providing 154 a user interface component showing at least a subset of the compiler errors and/or compiler warnings with translated keywords. For example, the further user interface component may be integrated in the first user interface component, e.g., as additional text in the respective lines of code. Alternatively, the further user interface component may be separate from the first user interface component, e.g., a window or window portion for displaying compiler warnings and/or compiler errors.

The proposed concept is particularly useful for programming beginners, as the translation of the keywords can lower the barrier of entry for non-English-speaking beginners. Beginners (and professionals alike) often learn programming by copying examples from tutorials. However, many tutorials are provided in the programming language (without translated keywords). To integrate the code copied from tutorials, the copy & paste functionality may be adapted. For example, the processing circuitry may be configured to provide a copy and paste functionality. Accordingly, the method may comprise providing 160 a copy and paste functionality. In particular, the code may be copied, from the first user interface component, in the programming language (i.e., without translated keywords). For example, the code may be translated back into the programming language prior to copying (e.g., similar to storing the code). Code being pasted may be pasted into the file in the programming language and translated for editing in the first user interface component into the selected intermediate language. In other words, the code being pasted may be stored in the file in the programming language; the pasted code may be translated prior to being displayed in the first user interface component.

Another useful functionality of modern IDEs is the code completion functionality. A code completion functionality is configured to provide, based on the first characters of a programming statement being typed, a selection of matching programming statements, which can be selected via keyboard or pointer device. The processing circuitry may be configured to provide the code completion functionality, and to translate the keywords of the programming language being used in the code completion functionality into the selected intermediate language.

The proposed concept may aim to facilitate access to programming for beginners that do not speak English as a primary language. However, there are hundreds of different intermediate language, and many relevant and popular programming languages, leading to a multitude of combinations of intermediate language and programming language. Crowdsourcing may be used to generate and improve the dictionaries being used to perform the translation. In some examples, the IDE may be extended by a third user interface component, e.g., a dictionary editing user interface component, which may be used to create, edit, download and/or share dictionaries. For example, the processing circuitry may be configured to provide the third user interface component for editing the dictionary. Accordingly, the method may comprise providing 170 a third user interface component for editing the dictionary. For example, the processing circuitry may be configured to obtain (e.g., download) the dictionary from a server (e.g., the server 105 shown in FIG. 1b) and/or to provide (e.g., share, upload) the edited dictionary, e.g., as edited in the third user interface component, to the server. Accordingly, as further shown in FIG. 1c, the method may comprise obtaining 172 the dictionary from the server and/or providing 174 the edited dictionary to the server. The translation may be performed based on the dictionary, as downloaded from the server and/or as edited in the third user interface component.

The proposed concept operates by providing a translation functionality and by displaying the code with the translated keywords in the IDE. Therefore, the processing circuitry may be configured to provide the IDE with the first and second component (and optionally the third and/or further user interface component). For example, the processing circuitry may be configured to provide the functionality and the user interface of the IDE. The IDE may be output via a display. For example, as shown in FIG. 1b, the processing circuitry may be configured to provide a display signal to a display 18 (e.g., via the interface circuitry), which may be part of the computer system 100 or which may be coupled with the computer system 100.

The display signal may comprise a graphical representation of the user interface of the IDE. For example, the processing circuitry may be configured to obtain, e.g., via the interface circuitry, input signals from one or more input devices (e.g., keyboard, mouse, touchpad) of the computer system, and to control the IDE based on the input signals.

The interface circuitry 12 or means for communicating 12 of FIGS. 1a and 1b may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 of FIGS. 1a and 1b may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the storage circuitry 16 or means for storing information 16 of FIGS. 1a and 1b may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the apparatus 10, device 10, method, computer program and computer system 100 are mentioned in connection with the proposed concept or one or more examples described above or below (e.g., FIGS. 2a to 4). The apparatus 10, device 10, method, computer program and computer system 100 may comprise one or more additional optional features corresponding to one or more aspects of the proposed concept, or one or more examples described above or below.

Various examples of the present disclosure relate to a concept for language-independent programming that uses text editor translation.

The proposed concept relates to a text editor-based translation between any spoken language for a given programming language. The translation may include word-to-word translation as well as positional translation for languages where the natural word ordering may differ from what a direct translation would produce. The proposed concept may enable or improve a worldwide adoption of programming languages and application programming interfaces, such as Intel® oneAPI, as well as international collaboration. The proposed concept may be integrated in existing text editors, such as Sublime Text or Visual Studio Code.

The proposed concept integrates the translation into the text editor, which may leave the compiler and file system unaware of this translation layer. This may allow translation between any spoken language for any of the popular programming languages without having to change compilers. The proposed concept may be implemented as part of the front-end user interface. For example, a user-facing option may be provided to toggle between different spoken languages, provide the corresponding translation of the programming language in the text editor.

Figure 2A:
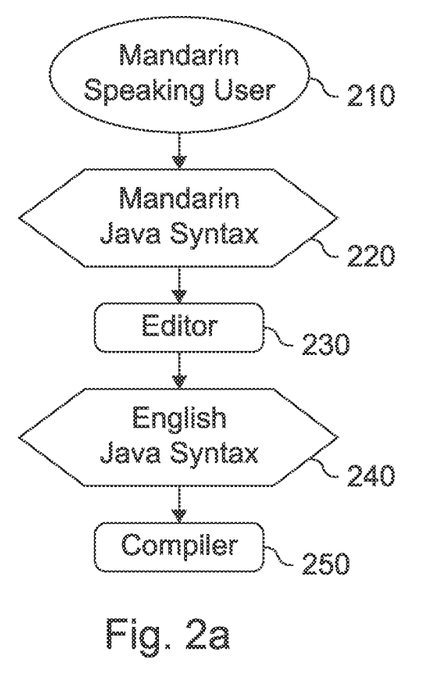
FIGS. 2a and 2b show schematic illustrations of two use cases of the proposed concept.
Figure 2B:
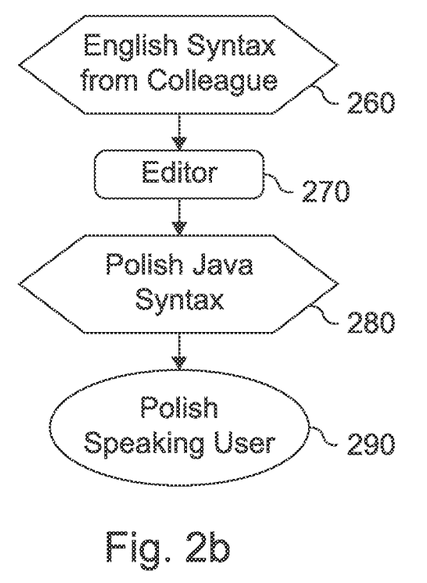

FIGS. 2a and 2b show schematic illustrations of two use cases of the proposed concept. In FIG. 2a, a mandarin-speaking user 210 writes code in their native language (i.e., using a Mandarin-based Java syntax 220). In the editor 230, the code in the Mandarin-based Java syntax is translated into English Java syntax 240, which is provided to the compiler 250. In FIG. 2b, a polish-speaking user 290 is reading or reviewing code they have received in their native language (i.e., in Polish Java syntax), with the code being provided in the English Java syntax 260 and translated by the editor 270.

The proposed concept provides word-to-word translation or keywords and library defined functions/parameters (which may be considered keywords as well). The translation may be performed using a dictionary for each of the widely used programming languages and accompanying libraries. Direct translation can often be misleading. In FIG. 3b, print is translated to pokaz, which is in fact the Polish word for display. Such non-direct translations can be captured by the dictionary implementation.

In some examples, in addition to word-to-word translation, positional translation may be used. For languages where the natural word ordering may differ from what a direct translation would produce, the proposed concept may provide re-ordering based on the spoken language, e.g., via dictionary entries such as "if (<a>)"⇆"(<a>) if".

Various aspects of the present disclosure relate to the user interface of a text editor. Modern text editors already support syntax highlighting where the user can choose to view the code as "Plain Text" or "Python" or any other programming language using the toggle provided. FIG. 3a shows a schematic illustration of a user interface of an integrated development environment. FIG. 3a shows how the keywords and language elements are highlighted in different colors and/or fonts, with the left side showing the code without syntax highlighting and the right side showing the code with syntax highlighting. On the bottom of the user interface, below the text editor field, a menu bar provides several buttons for accessing three dropdown menus, a dropdown menu for selecting text encoding 310 (Unicode Transformation Format, UTF, 8 in the example of FIG. 3a), a dropdown menu for selecting line break coding (Carriage Return Line Feed, CRLF, in the example of FIG. 3a), and a dropdown menu for selecting syntax highlighting, which is set to plain text 330 on the left side of FIG. 3a, and to Python 340 on the right side of FIG. 3a.

This can be implemented with a set of rules that tells the editor to display a particular keyword in a color, for example. The file system and compiler are unaware of any such changes as these are all rendered in the text editor. An example of Vim's (a popular text editor in Unixoid systems) syntax highlighting rule structure with rules describing what to do with keywords and what we expect to follow keywords:

"Keywords
syn keyword syntaxElementKeyword keyword1 keyword2 nextgroup=syntaxElement2
"Matches
syn match syntaxElementMatch 'regexp' contains=syntaxElement1 nextgroup=syntaxElement2

FIG. 3b shows a schematic illustration of a user interface of an integrated development environment, enabling the selection of an intermediate language. FIG. 3b may show an example of extending the interface to include embedded translation in the text editor. The proposed user interface, as shown in FIG. 3b, adds a toggle 350; 360 allowing the user to view their code with the original English based programming language (350) or the native language of the programmer, in this example Polish 360. This selection may be auto detected or configurable.

In various examples, the translation is bi-directional, allowing the user to write their code in their native language, leaving the text editor to handle the translation back to the original English based programming language. This requires no modifications to compilers as they will still see the original English language code.

Various examples of the present disclosure use a dictionary-based translation. Each dictionary entry may encode a word-to-word translation, where the word may be a keyword or a library function name, and/or a positional translation. Dictionary rules may be applied by detecting matches in the code to be translated, similar to how the syntax highlighting rules are applied. Positional translation and word-to-word dictionary entries may be applied in separate passes, where the positional translation may operate on the original English language code.

Figure 4:
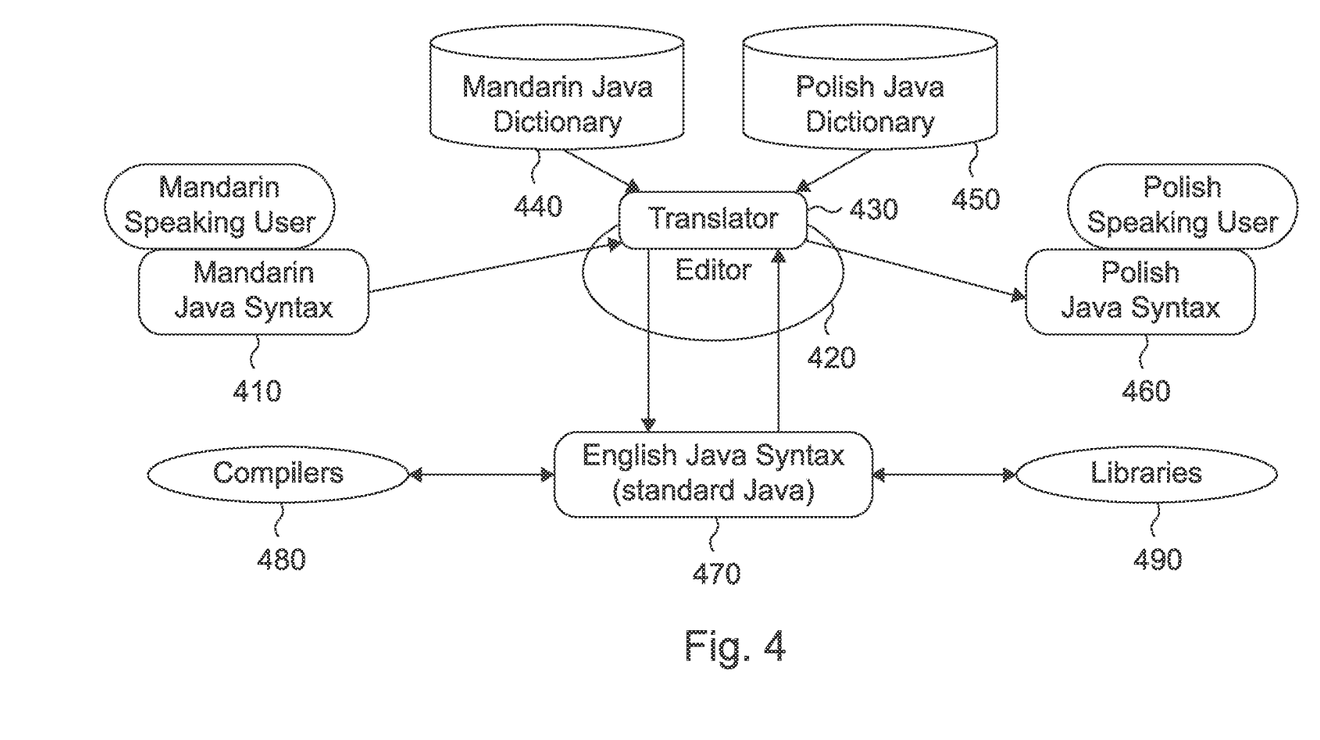
FIG. 4 shows a flow diagram of an example of the translation process.

To avoid excessive dictionary generation, English language code can be used as an intermediate representation, see FIG. 4. FIG. 4 shows a flow diagram of an example of the translation process. FIG. 4 may show a flow diagram to describe the translation process, where the standard English based syntax is the central representation and interface to the compilers, libraries, and debuggers. Returning to the use cases shown in FIGS. 2a and 2b, a Mandarin-speaking user writes code that is based on a Mandarin-based Java syntax 410, which is provided to a text editor 420 with a translator component 430, with the translator component 430 having access to a Mandarin Java dictionary 440 and a Polish Java dictionary 450. The translator component may translate the code of the Mandarin-speaking user to code in the English Java syntax (standard Java) 470, and the code in the English Java syntax into code in the Polish Java syntax 460 for a Polish-speaking user. The code in the English Java syntax is used for compiling the code in a compiler 480 and for accessing libraries 490.

In some examples of the proposed concept, text editor-based compiler error translation may be provided. Without changes to the compilers, errors generated by the compilers are still English based, therefore translation may be provided at this level too. Compiler error translation may be comparatively easy, as each error generates an error code with some associated data. Passing this data to the text editor, the error message translation may be embedded in the editor, displaying an appropriately translated message.

Some examples may use community-generated dictionaries. Users may have the option to supply their own dictionaries as well as using community generated dictionaries, allowing different dialects to evolve. For example, users may have the option to feedback suggested translations to moderators via a simple interface in the editor (e.g., the third user interface component). The moderator for a language may be provided with the tools (e.g., a JavaScript library) to easily host an infrastructure that can receive input from text editor users. Allowing users to provide additional or alternative translations, as well as monitoring the popularity for certain inputs, would significantly reduce the overhead to mature the translation for a new language. The proposed crowdsourcing model may facilitate fast growth of supported languages (both programming and spoken). Documentation can be automatically generated based off the dictionaries, where the templates can also be community-generated.

More details and aspects of the concept for language-independent programming are mentioned in connection with the proposed concept or one or more examples described above or below (e.g., FIG. 1a to 1c). The concept for language-independent programming may comprise one or more additional optional features corresponding to one or more aspects of the proposed concept, or one or more examples described above or below.

In the following, some examples of the proposed concept are presented:

An example (e.g., example 1) relates to an apparatus (10) for an integrated development environment, the apparatus (10) comprising processing circuitry (14) configured to provide a first user interface component of the integrated development environment for editing code written in a programming language. The processing circuitry is configured to provide a second user interface component of the integrated development environment for selecting an intermediate language to use for displaying the code in the first user interface component. The processing circuitry is configured to translate keywords of the code between the selected intermediate language and corresponding keywords of the programming language when loading code for editing in the first user interface component from a file and when saving code edited in the first user interface component to a file, with the programming language being based on a language that is different from the selected intermediate language.

Another example (e.g., example 2) relates to a previously described example (e.g., example 1) or to any of the examples described herein, further comprising that the programming language is based on the English language and the selected intermediate language is a language other than English.

Another example (e.g., example 3) relates to a previously described example (e.g., one of the examples 1 to 2) or to any of the examples described herein, further comprising that the keywords relate to programming statements of the programming language.

Another example (e.g., example 4) relates to a previously described example (e.g., one of the examples 1 to 3) or to any of the examples described herein, further comprising that the first user interface component is a text editor user interface component.

Another example (e.g., example 5) relates to a previously described example (e.g., one of the examples 1 to 4) or to any of the examples described herein, further comprising that the processing circuitry is configured to translate keywords written in the selected intermediate language into the corresponding keywords of the programming language and to store the code with the translated keywords in the file.

Another example (e.g., example 6) relates to a previously described example (e.g., one of the examples 1 to 5) or to any of the examples described herein, further comprising that the processing circuitry is configured to translate keywords of the programming language into corresponding keywords in the selected intermediate language when loading code from the file.

Another example (e.g., example 7) relates to a previously described example (e.g., one of the examples 1 to 6) or to any of the examples described herein, further comprising that the processing circuitry is configured to perform the translation based on a dictionary, the dictionary defining, for the keywords of the programming language, corresponding keywords in the selected intermediate language.

Another example (e.g., example 8) relates to a previously described example (e.g., example 7) or to any of the examples described herein, further comprising that the dictionary further defines, for at least a subset of the corresponding keywords in the selected intermediate language, information on a positional translation of the keyword, wherein the processing circuitry is configured to adjust the order of words of the code relative to the respective keywords based on the information on the positional translation of the keyword.

Another example (e.g., example 9) relates to a previously described example (e.g., one of the examples 7 to 8) or to any of the examples described herein, further comprising that the processing circuitry is configured to provide a third user interface component for editing the dictionary, wherein the translation is being performed based on the dictionary as edited in the third user interface component.

Another example (e.g., example 10) relates to a previously described example (e.g., example 9) or to any of the examples described herein, further comprising that the processing circuitry is configured to provide the edited dictionary to a server.

Another example (e.g., example 11) relates to a previously described example (e.g., one of the examples 7 to 10) or to any of the examples described herein, further comprising that the processing circuitry is configured to obtain the dictionary from a server.

Another example (e.g., example 12) relates to a previously described example (e.g., one of the examples 1 to 11) or to any of the examples described herein, further comprising that the second user interface component is provided to enable the user to switch between a representation of the code in the programming language and a representation of the code with keywords being translated into the selected intermediate language.

Another example (e.g., example 13) relates to a previously described example (e.g., one of the examples 1 to 12) or to any of the examples described herein, further comprising that the second user interface component of the integrated development environment is suitable for selecting between the programming language and one or more intermediate languages.

Another example (e.g., example 14) relates to a previously described example (e.g., one of the examples 1 to 13) or to any of the examples described herein, further comprising that the processing circuitry is configured to compile the code in the file, with the code being stored in the programming language in the file.

Another example (e.g., example 15) relates to a previously described example (e.g., example 14) or to any of the examples described herein, further comprising that the processing circuitry is configured to translate keywords of compiler errors and/or compiler warnings into the selected intermediate language, and to provide a user interface component showing at least a subset of the compiler errors and/or compiler warnings with translated keywords.

Another example (e.g., example 16) relates to a previously described example (e.g., one of the examples 1 to 15) or to any of the examples described herein, further comprising that the processing circuitry is configured to provide a copy and paste functionality, with code being copied in the programming language, and with code being pasted into the file in the programming language and translated for editing in the first user interface component into the selected intermediate language.

Another example (e.g., example 17) relates to a previously described example (e.g., one of the examples 1 to 16) or to any of the examples described herein, further comprising that the intermediate language is one of a natural language, an artificial or invented language and a symbolic language.

An example (e.g., example 18) relates to a computer system (100) comprising the apparatus (10) according to one of the examples 1 to 17 or according to any other example.

An example (e.g., example 19) relates to a device (10) for an integrated development environment, the device (10) comprising means for processing (14) configured to provide a first user interface component of the integrated development environment for editing code written in a programming language. The means for processing is configured to provide a second user interface component of the integrated development environment for selecting an intermediate language to use for displaying the code in the first user interface component. The means for processing is configured to translate keywords of the code between the selected intermediate language and corresponding keywords of the programming language when loading code for editing in the first user interface component from a file and when saving code edited in the first user interface component to a file, with the programming language being based on a language that is different from the selected intermediate language.

Another example (e.g., example 20) relates to a previously described example (e.g., example 19) or to any of the examples described herein, further comprising that the programming language is based on the English language and the selected intermediate language is a language other than English.

Another example (e.g., example 21) relates to a previously described example (e.g., one of the examples 19 to 20) or to any of the examples described herein, further comprising that the keywords relate to programming statements of the programming language.

Another example (e.g., example 22) relates to a previously described example (e.g., one of the examples 19 to 21) or to any of the examples described herein, further comprising that the first user interface component is a text editor user interface component.

Another example (e.g., example 23) relates to a previously described example (e.g., one of the examples 19 to 22) or to any of the examples described herein, further comprising that the means for processing is configured to translate keywords written in the selected intermediate language into the corresponding keywords of the programming language and to store the code with the translated keywords in the file.

Another example (e.g., example 24) relates to a previously described example (e.g., one of the examples 19 to 23) or to any of the examples described herein, further comprising that the means for processing is configured to translate keywords of the programming language into corresponding keywords in the selected intermediate language when loading code from the file.

Another example (e.g., example 25) relates to a previously described example (e.g., one of the examples 19 to 25) or to any of the examples described herein, further comprising that the means for processing is configured to perform the translation based on a dictionary, the dictionary defining, for the keywords of the programming language, corresponding keywords in the selected intermediate language.

Another example (e.g., example 26) relates to a previously described example (e.g., example 25) or to any of the examples described herein, further comprising that the dictionary further defines, for at least a subset of the corresponding keywords in the selected intermediate language, information on a positional translation of the keyword, wherein the means for processing is configured to adjust the order of words of the code relative to the respective keywords based on the information on the positional translation of the keyword.

Another example (e.g., example 27) relates to a previously described example (e.g., one of the examples 25 to 26) or to any of the examples described herein, further comprising that the means for processing is configured to provide a third user interface component for editing the dictionary, wherein the translation is being performed based on the dictionary as edited in the third user interface component.

Another example (e.g., example 28) relates to a previously described example (e.g., example 27) or to any of the examples described herein, further comprising that the means for processing is configured to provide the edited dictionary to a server.

Another example (e.g., example 29) relates to a previously described example (e.g., one of the examples 25 to 28) or to any of the examples described herein, further comprising that the means for processing is configured to obtain the dictionary from a server.

Another example (e.g., example 30) relates to a previously described example (e.g., one of the examples 19 to 29) or to any of the examples described herein, further comprising that the second user interface component is provided to enable the user to switch between a representation of the code in the programming language and a representation of the code with keywords being translated into the selected intermediate language.

Another example (e.g., example 31) relates to a previously described example (e.g., one of the examples 19 to 30) or to any of the examples described herein, further comprising that the second user interface component of the integrated development environment is suitable for selecting between the programming language and one or more intermediate languages.

Another example (e.g., example 32) relates to a previously described example (e.g., one of the examples 19 to 31) or to any of the examples described herein, further comprising that the means for processing is configured to compile the code in the file, with the code being stored in the programming language in the file.

Another example (e.g., example 33) relates to a previously described example (e.g., example 32) or to any of the examples described herein, further comprising that the means for processing is configured to translate keywords of compiler errors and/or compiler warnings into the selected intermediate language, and to provide a user interface component showing at least a subset of the compiler errors and/or compiler warnings with translated keywords.

Another example (e.g., example 34) relates to a previously described example (e.g., one of the examples 19 to 33) or to any of the examples described herein, further comprising that the means for processing is configured to provide a copy and paste functionality, with code being copied in the programming language, and with code being pasted into the file in the programming language and translated for editing in the first user interface component into the selected intermediate language.

Another example (e.g., example 35) relates to a previously described example (e.g., one of the examples 19 to 34) or to any of the examples described herein, further comprising that the intermediate language is one of a natural language, an artificial or invented language and a symbolic language.

An example (e.g., example 36) relates to a computer system (100) comprising the device (10) according to one of the examples 19 to 35 or according to any other example.

An example (e.g., example 37) relates to a method for an integrated development environment, the method comprising providing (110) a first user interface component of the integrated development environment for editing code written in a programming language. The method comprises providing (120) a second user interface component of the integrated development environment for selecting an intermediate language to use for displaying the code in the first user interface component. The method comprises translating (130) keywords of the code between the selected intermediate language and corresponding keywords of the programming language when loading code for editing in the first user interface component from a file and when saving code edited in the first user interface component to a file, with the programming language being based on a language that is different from the selected intermediate language.

Another example (e.g., example 38) relates to a previously described example (e.g., example 37) or to any of the examples described herein, further comprising that the programming language is based on the English language and the selected intermediate language is a language other than English.

Another example (e.g., example 39) relates to a previously described example (e.g., one of the examples 37 to 38) or to any of the examples described herein, further comprising that the keywords relate to programming statements of the programming language.

Another example (e.g., example 40) relates to a previously described example (e.g., one of the examples 37 to 39) or to any of the examples described herein, further comprising that the first user interface component is a text editor user interface component.

Another example (e.g., example 41) relates to a previously described example (e.g., one of the examples 37 to 40) or to any of the examples described herein, further comprising that the method comprises translating (130) keywords written in the selected intermediate language into the corresponding keywords of the programming language and storing (132) the code with the translated keywords in the file.

Another example (e.g., example 42) relates to a previously described example (e.g., one of the examples 37 to 41) or to any of the examples described herein, further comprising that the method comprises translating (130) keywords of the programming language into corresponding keywords in the selected intermediate language when loading (134) code from the file.

Another example (e.g., example 43) relates to a previously described example (e.g., one of the examples 37 to 42) or to any of the examples described herein, further comprising that the method comprises performing the translation (130) based on a dictionary, the dictionary defining, for the keywords of the programming language, corresponding keywords in the selected intermediate language.

Another example (e.g., example 44) relates to a previously described example (e.g., example 43) or to any of the examples described herein, further comprising that the dictionary further defines, for at least a subset of the corresponding keywords in the selected intermediate language, information on a positional translation of the keyword, wherein the method comprises adjusting (140) the order of words of the code relative to the respective keywords based on the information on the positional translation of the keyword.

Another example (e.g., example 45) relates to a previously described example (e.g., one of the examples 43 to 44) or to any of the examples described herein, further comprising that the method comprises providing (170) a third user interface component for editing the dictionary, wherein the translation is being performed based on the dictionary as edited in the third user interface component.

Another example (e.g., example 46) relates to a previously described example (e.g., example 45) or to any of the examples described herein, further comprising that the method comprises providing (174) the edited dictionary to a server.

Another example (e.g., example 47) relates to a previously described example (e.g., one of the examples 45 to 46) or to any of the examples described herein, further comprising that the method comprises obtaining (172) the dictionary from a server.

Another example (e.g., example 48) relates to a previously described example (e.g., one of the examples 37 to 47) or to any of the examples described herein, further comprising that the second user interface component is provided (120) to enable the user to switch between a representation of the code in the programming language and a representation of the code with keywords being translated into the selected intermediate language.

Another example (e.g., example 49) relates to a previously described example (e.g., one of the examples 37 to 48) or to any of the examples described herein, further comprising that the second user interface component of the integrated development environment is suitable for selecting between the programming language and one or more intermediate languages.

Another example (e.g., example 50) relates to a previously described example (e.g., one of the examples 37 to 49) or to any of the examples described herein, further comprising that the method comprises compiling (150) the code in the file, with the code being stored in the programming language in the file.

Another example (e.g., example 51) relates to a previously described example (e.g., example 50) or to any of the examples described herein, further comprising that the method comrises translating (152) keywords of compiler errors and/or compiler warnings into the selected intermediate language and providing (154) a user interface component showing at least a subset of the compiler errors and/or compiler warnings with translated keywords.

Another example (e.g., example 52) relates to a previously described example (e.g., one of the examples 37 to 51) or to any of the examples described herein, further comprising that the method comprises providing (160) a copy and paste functionality, with code being copied in the programming language, and with code being pasted into the file in the programming language and translated for editing in the first user interface component into the selected intermediate language.

Another example (e.g., example 53) relates to a previously described example (e.g., one of the examples 37 to 52) or to any of the examples described herein, further comprising that the intermediate language is one of a natural language, an artificial or invented language and a symbolic language.

An example (e.g., example 54) relates to a computer system (100) being configured to perform the method according to one of the examples 37 to 53 or according to any other example.

An example (e.g., example 55) relates to a machine-readable storage medium including program code, when executed, to cause a machine to perform the method of one of the examples 37 to 53 or according to any other example.

An example (e.g., example 56) relates to a computer program having a program code for performing the method of one of the examples 37 to 53 or according to any other example when the computer program is executed on a computer, a processor, or a programmable hardware component.

An example (e.g., example 57) relates to a machine-readable storage including machine readable instructions, when executed, to implement a method or realize an apparatus as claimed in any pending claim or shown in any example.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computerexecutable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computerexecutable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present, or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method for an integrated development environment, the method comprising:
   providing a first user interface component of the integrated development environment for editing code written in a programming language;
   providing a second user interface component of the integrated development environment for selecting an intermediate language to use for displaying the code in the first user interface component;
   translating keywords of the code between the selected intermediate language and corresponding keywords of the programming language when loading code for editing in the first user interface component from a file and when saving code edited in the first user interface component to the file, with the programming language being based on a language that is different from the selected intermediate language;
   compiling the code in the file with the code being stored in the programming language in the file; and
   translating keywords of compiler errors and/or compiler warnings into the selected intermediate language and providing a user interface component showing at least a subset of the compiler errors and/or compiler warnings with translated keywords.

2. The method according to claim 1, wherein the programming language is based on the English language and the selected intermediate language is a language other than English.

3. The method according to claim 1, wherein the second user interface component is provided to enable the user to switch between a representation of the code in the programming language and a representation of the code with keywords being translated into the selected intermediate language.

4. An apparatus for an integrated development environment, the apparatus comprising processing circuitry configured to:
   provide a first user interface component of the integrated development environment for editing code written in a programming language;
   provide a second user interface component of the integrated development environment for selecting an intermediate language to use for displaying the code in the first user interface component; and
   translate keywords of the code between the selected intermediate language and corresponding keywords of the programming language when loading code for editing in the first user interface component from a file and when saving code edited in the first user interface component to the file, with the programming language being based on a language that is different from the selected intermediate language,
   wherein the processing circuitry is configured to compile the code in the file with the code being stored in the programming language in the file,
   wherein the processing circuitry is configured to translate keywords of compiler errors and/or compiler warnings into the selected intermediate language and to provide a user interface component showing at least a subset of the compiler errors and/or compiler warnings with translated keywords.

5. The apparatus according to claim 4, wherein the programming language is based on the English language and the selected intermediate language is a language other than English.

6. The apparatus according to claim 4, wherein the keywords relate to programming statements of the programming language.

7. The apparatus according to claim 4, wherein the first user interface component is a text editor user interface component.

8. The apparatus according to claim 4, wherein the processing circuitry is configured to translate keywords written in the selected intermediate language into the corresponding keywords of the programming language and to store the code with the translated keywords in the file.

9. The apparatus according to claim 4, wherein the processing circuitry is configured to translate keywords of the programming language into corresponding keywords in the selected intermediate language when loading code from the file.

10. The apparatus according to claim 4, wherein the processing circuitry is configured to perform the translation based on a dictionary, the dictionary defining, for the keywords of the programming language, corresponding keywords in the selected intermediate language.

11. The apparatus according to claim 10, wherein the dictionary further defines, for at least a subset of the corresponding keywords in the selected intermediate language, information on a positional translation of the keyword, wherein the processing circuitry is configured to adjust the order of words of the code relative to the respective keywords based on the information on the positional translation of the keyword.

12. The apparatus according to claim 10, wherein the processing circuitry is configured to provide a third user interface component for editing the dictionary, wherein the translation is being performed based on the dictionary as edited in the third user interface component.

13. The apparatus according to claim 12, wherein the processing circuitry is configured to provide the edited dictionary to a server.

14. The apparatus according to claim 10, wherein the processing circuitry is configured to obtain the dictionary from a server.

15. The apparatus according to claim 4, wherein the second user interface component is provided to enable the user to switch between a representation of the code in the programming language and a representation of the code with keywords being translated into the selected intermediate language.

16. The apparatus according to claim 4, wherein the second user interface component of the integrated development environment is suitable for selecting between the programming language and one or more intermediate languages.

17. The apparatus according to claim 4, wherein the processing circuitry is configured to provide a copy and paste functionality, with code being copied in the programming language, and with code being pasted into the file in the programming language and translated for editing in the first user interface component into the selected intermediate language.

18. The apparatus according to claim 4, wherein the intermediate language is one of a natural language, an artificial or invented language and a symbolic language.

19. A machine-readable storage medium including program code, when executed, to cause a machine to perform a method for an integrated development environment, the method comprising:
  providing a first user interface component of the integrated development environment for editing code written in a programming language;
  providing a second user interface component of the integrated development environment for selecting an intermediate language to use for displaying the code in the first user interface component;
  translating keywords of the code between the selected intermediate language and corresponding keywords of the programming language when loading code for editing in the first user interface component from a file and when saving code edited in the first user interface component to the file, with the programming language being based on a language that is different from the selected intermediate language;
  compiling the code in the file with the code being stored in the programming language in the file; and
  translating keywords of compiler errors and/or compiler warnings into the selected intermediate language and providing a user interface component showing at least a subset of the compiler errors and/or compiler warnings with translated keywords.

* * * * *